United States Patent
Broyles, III et al.

(10) Patent No.: US 7,313,685 B2
(45) Date of Patent: Dec. 25, 2007

(54) UNATTENDED BIOS RECOVERY (75) Inventors: Paul J. Broyles, III, Cypress, TX (US);
Don R. James, Jr., Houston, TX (US);
Mark A. Piwonka, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 399 days.

(21) Appl. No.: 10/897,014

(22) Filed: Jul. 23, 2004

(65) Prior Publication Data
US 2006/0020845 A1 Jan. 26, 2006

(51) Int. Cl.
G06F 9/00 (2006.01)
G06F 15/177 (2006.01)
(52) U.S. Cl. ............... 713/2; 713/1; 713/100; 714/2; 714/13; 714/36; 714/38; 709/203
(58) Field of Classification Search ............ 713/2; 714/36
See application file for complete search history.

(56) References Cited

U.S. PATENT DOCUMENTS

| 5,230,052 | A  | * | 7/1993  | Dayan et al. .................. 713/2 |
| 5,732,268 | A  | * | 3/1998  | Bizzarri ........................ 713/2 |
| 6,314,455 | B1 | * | 11/2001 | Cromer et al. ............... 709/217 |
| 6,857,069 | B1 | * | 2/2005  | Rissmeyer et al. ............ 713/2 |
| 6,934,873 | B2 | * | 8/2005  | Lu et al. ........................ 714/2 |
| 7,013,385 | B2 | * | 3/2006  | Abbondanzio et al. ........ 713/2 |
| 7,082,527 | B2 | * | 7/2006  | Zimmer et al. ................ 713/2 |
| 7,114,068 | B2 | * | 9/2006  | Chu et al. ...................... 713/2 |
| 7,143,279 | B2 | * | 11/2006 | Goud et al. ................... 713/2 |
| 2002/0147941 | A1 | * | 10/2002 | Gentile ........................ 714/36 |
| 2003/0005096 | A1 | * | 1/2003  | Paul et al. ................... 709/222 |
| 2003/0188176 | A1 | * | 10/2003 | Abbondanzio et al. ..... 713/191 |
| 2004/0081104 | A1 | * | 4/2004  | Pan et al. .................... 370/254 |
| 2004/0260936 | A1 | * | 12/2004 | Hiray et al. ................. 713/200 |
| 2005/0071623 | A1 | * | 3/2005  | Goud et al. ................. 713/100 |
| 2005/0076107 | A1 | * | 4/2005  | Goud et al. ................. 709/223 |

* cited by examiner

Primary Examiner—Nitin C. Patel (57) ABSTRACT

In accordance with one embodiment of the present invention, a method for recovering a BIOS in a computer is described, comprising: unattendingly loading a BIOS recovery code image into system ROM stored on a bootable device; and unattendingly rebooting the computer.

40 Claims, 6 Drawing Sheets

UNATTENDED BIOS RECOVERY

BACKGROUND

The cost of administering an organization's personal computers (PCs) and the loss of worker efficiency due to PC failures can be significant. Typically, each PC is dedicated to one user. The PC may have a network connection, local disk storage, input/output devices, etc., and is used primarily by that one user. If a PC becomes inoperative, a system administrator must personally go to the PC's location to manually repair the computer. In a large organization, or in the case of a PC at a remote location, providing such individualized service can be time consuming and inefficient, significantly producing and increasing cost of ownership.

To reduce these and other adverse effects of PC failures, and to increase the efficiency of providing PC service, a recent trend has been to replace desktop PCs with blade-PC's. A blade-PC is a computer that may include a processor, memory, hard drive, and network interface, but no input/output devices such as a mouse, keyboard, monitor, or external disk drive. A plurality of blade-PCs may be housed in a single rack-mount enclosure at a remote location accessible by users via a network. This configuration allows a user with a thin-client to connect to the blade-PCs via the network. A thin client is a computer with minimal storage and computing capacity, but that does include a keyboard, mouse, monitor and network interface. Typically, multiple blade-PCs are networked together to service multiple thin-clients. A load balancer is commonly used to distribute work among the various blade-PCs. Because blade-PCs are typically co-located, servicing and upgrading such computers is often found to be more efficient than servicing and upgrading traditional desktop PCs.

When booting a computer, whether a blade-PC or desktop PC, a portion of the basic input/output-system (BIOS) code, referred to as the boot code, is executed. The boot code loads an operating system from system ROM into system memory where it is then executed. Typically, the system ROM is electrically-erasable read-only memory (EEPROM), although other non-volatile storage devices are used as well. Occasionally, the BIOS code will need to be upgraded to correct existing problems or to add new functionality. Typically, to access a corrupted or outdated BIOS of a desktop PC, an administrator must go to each such PC and boot the PC from a portable computer-readable medium such as a CD-ROM or floppy disk that includes a recovery BIOS code image and update tool. Similarly, to access a corrupted or updated BIOS in a blade-PC, an administrator must go to each blade-PC, attach a keyboard, mouse, monitor, and CD-ROM or floppy drive, and boot the blade-PC from the portable medium which contains the recovery BIOS code image and update tool. Once the update tool loads the recovery BIOS image into system ROM, the administrator restarts the computer, which should then boot normally. This procedure must be performed at each desktop and blade-PC for which the BIOS is to be upgraded or replaced.

Because bade-PCs typically share a common location, they are often remotely and concurrently upgraded with the same BIOS flash utility. In addition, co-located blade-PCs often share a common power source, particularly those housed in the same racks and rack mount enclosures. These factors increase the likelihood that co-located blade-PCs may simultaneously experience a BIOS corruption. Thus, even though the blade-PCs can be more efficiently administered, the time to service each blade-PC can still be significant source of delay and inefficiency.

SUMMARY

In accordance with one embodiment of the present invention, a method for recovering a BIOS in a computer is described, comprising: unattendingly loading a BIOS recovery code image into system ROM stored on a bootable device accessible to the computer; and unattendingly rebooting the computer.

In accordance with another embodiment of the present invention, a computer is described, comprising: a processor; and system ROM having stored therein BIOS code to boot the computer, the BIOS code comprising: boot code for booting the computer; and boot block code configured to unattendedly replace the BIOS code image with a recovery BIOS code obtained from a bootable device accessible to the computer, and to unattendedly reboot the computer with the recovery BIOS code image.

DETAILED DESCRIPTION

Embodiments of the present invention are directed to the unattended replacement of the basic input/output system (BIOS) code of a computer. Such replacement may occur in response to an operator's indication to, for example, upgrade the BIOS, or in response to the automatic and unattended determination that the BIOS is corrupted. Such BIOS replacement (referred to as "recovery" herein regardless of purpose) may utilize a recovery BIOS code image stored in a memory device located in a local or remote bootable device accessible to the computer.

Such unattended BIOS recovery reduces or eliminates the requisite labor to service the computer under such circumstances thereby reducing the total cost of ownership. Also, the elimination of reliance on portable computer-readable medium to provide the recovery BIOS code image enables the BIOS recovery operations to be performed in remotely-located computers including co-located computers that typically lack disk drives, such as blade-servers and blade-PCs. In addition, embodiments that automatically perform the unattended BIOS recovery in response to the detection of a corrupted BIOS experience significantly reduced computer down-time.

It should be appreciated that embodiments of the present invention may be implemented in any processor-based computing environment now or later developed. To facilitate understanding of the present invention, embodiments of the invention are described below in connection with a blade-PC located in a network 100, a high-level block diagram of which is provided in FIG. 1. Network system 100 generally comprises a network 102 that provides communication links between various devices, computers and other networks. Network 102 may include permanent connections such as those made by wire or optical fiber, and/or may include temporary connections made via telephone or wireless connections.

Figure 1:
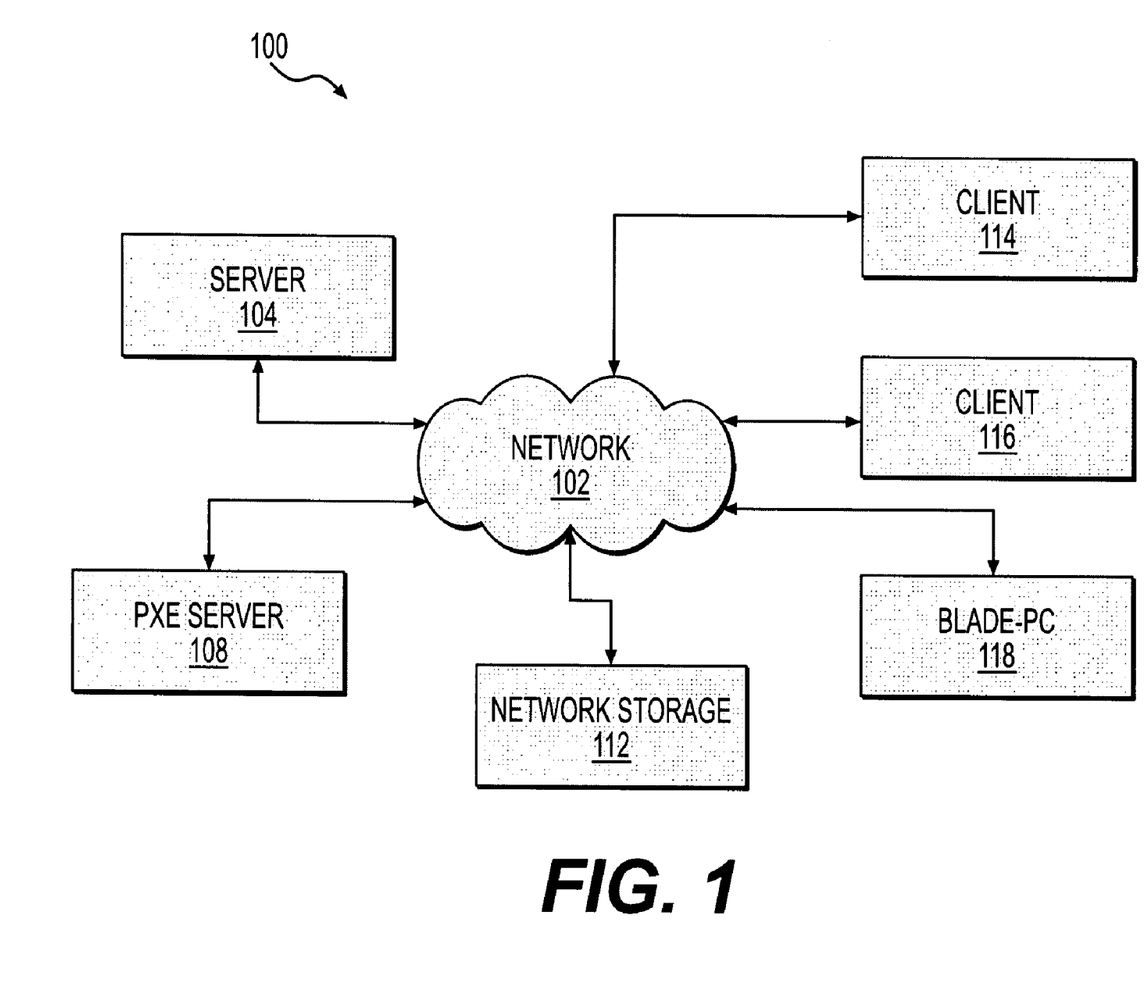
FIG. 1 is a high-level block diagram of an exemplary network system suitable for implementing embodiments of the present invention.

Network 100 comprises a server 104, a pre-boot execution environment (PXE) server 108, and a network storage device 112. In addition, clients 114, 116 and blade-PC 118 are connected to network 102. Clients 114, 116 may be personal computers (PCs), network computers, thin clients, or the like. In this exemplary environment, clients 114, 116 are thin-clients that communicate with blade-PC 118 via network 102 to make use of the resources of blade-PC 118.

As noted, a blade-PC comprises the processing and storage capabilities normally associated with a PC. Blade-PC 118 also includes interfaces to external I/O devices such as a keyboard, a mouse, a video monitor, or a disk drive. However, despite such capability, blade PC 118 is not typically connected to any of these or other peripheral devices. Rather, a blade-PC is connected via network 102 to one or more client PCs 114, 116 which, in this example, are thin-clients. As used herein, a thin-client is a computer that is coupled to network 102 and that primarily provides input/output functionality with minimal processing power and storage capabilities. Clients 114, 116 may also be clients to server 104, accessing data from network storage 112, or connected to other blade-PCs in network environment 100. Network 102 may be, for example and without limitation, a local area network, a wide area network, a metro area network, a company intranet, or the Internet.

In these exemplary embodiments, blade-PC 118 will have implemented therein BIOS code having, in addition to BIOS boot code, an embodiment of an auto-recovery boot block of the present invention. As will be described in detail below, the auto-recovery boot block unattendedly determines whether the BIOS code is corrupted and, if so, unattendedly locates, retrieves and loads a recovery BIOS code image stored in a bootable device on network 100, and further unattendedly reboots blade-PC 118.

Figure 2:
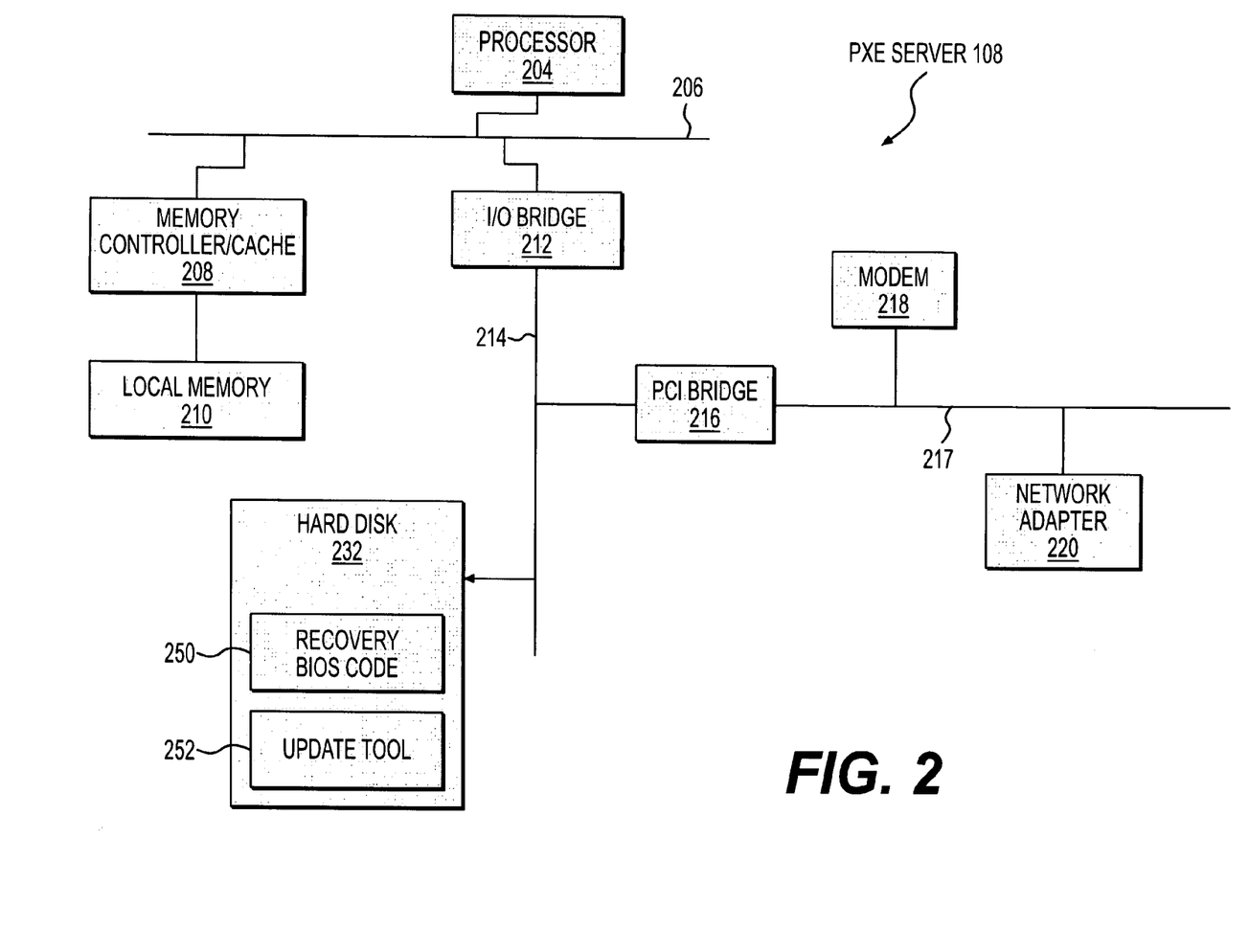
FIG. 2 is a simplified block diagram of an exemplary server in which a recovery BIOS code image and associated update tool are stored, in accordance with one embodiment of the present invention.

In this exemplary embodiment, the recovery BIOS code image is stored on PXE server 108 of network system 100. FIG. 2 is a functional block diagram of an exemplary implementation of PXE server 108. PXE server 108 comprises a processor 204 connected to a system bus 206. A memory controller/cache 208 is also connected to system bus 206 and further provides an interface to local memory 210. I/O bus bridge 212 is connected to system bus 206 and to an I/O bus 214. Although depicted as separate components, memory controller/cache 208 and I/O bus bridge 212 may be implemented as an integrated device.

Peripheral Control Interconnect (PCI) bridge 216 interconnects I/O bus 214 with a PCI local bus 217. A modem 218 and a network interface adapter 220 may be connected to PCI bus 217 to provide communications links to/from PXE server 108. With respect to FIG. 1, interconnections to network 102 and/or to clients 114, 116 may be accomplished by suitable modems 218 and network interface adapters 220 connected to the one or more available PCI buses. Additional modems and/or network interface adapters may be supported on this or other buses depending on system requirements.

In the exemplary embodiment of PXE server 108 illustrated in FIG. 2, recovery BIOS code image 250 and associated update tool 252 are stored on a hard disk 232 that is connected to I/O bus 214 of server 108. In this embodiment, recover BIOS code image 250 and its associated update tool 252 are accessible to the auto-recovery boot block executing in blade-PC 118, as described herein.

It should be recognized that the embodiment of PXE server 108 depicted in FIG. 2 is exemplary only and is not meant to imply any architectural limitations with respect to the location of recovery BIOS code image 250 and update tool 252 in network 100. Other server architectures that provide similar functionality may be used, and other peripheral devices may be added or substituted for those depicted in FIG. 2. It should also be appreciated by those of ordinary skill in the art that recovery BIOS code image 250 and update tool 252 need not be stored in the same device in network system 100.

Figure 3:
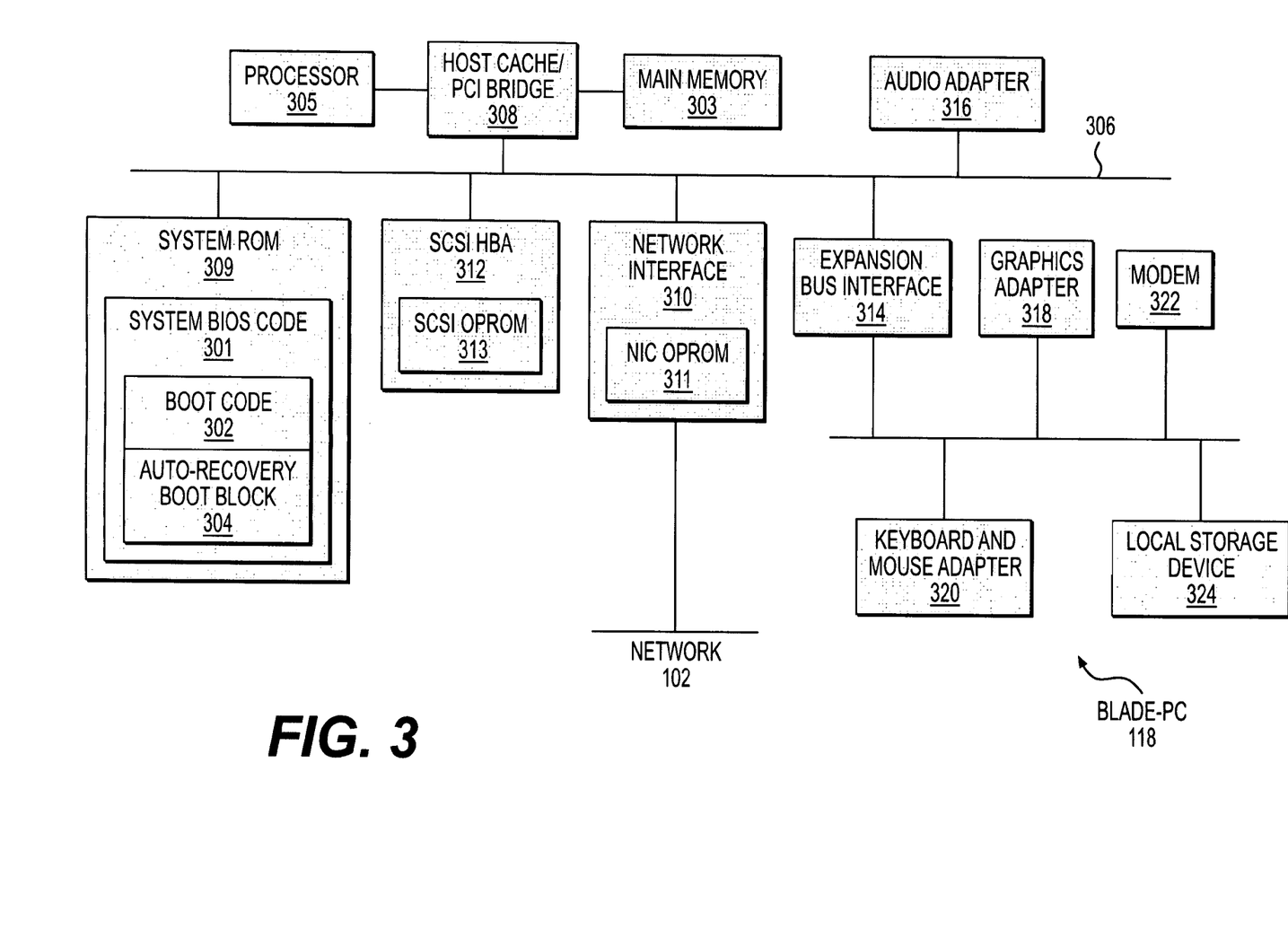
FIG. 3 is a high-level block diagram of an exemplary blade-PC in which one embodiment of an auto-recovery boot block is implemented.

FIG. 3 is an architectural block diagram of one embodiment of blade-PC 118 in which embodiments of the present invention are implemented. Blade-PC 118 comprises a processor 305 and main memory 303 both of which are connected to a PCI bus 306 via a PCI bridge 308. PCI bridge 308 may also include an integrated memory controller and cache memory for use by processor 305. System ROM 309 is also connected to PCI bus 306 and, in this embodiment, contains system BIOS code 301. As noted, system BIOS code 301 comprises BIOS boot code 302 and auto-recovery boot block 304. As noted, system ROM 309 may be any form of erasable ROM or other non-volatile memory such as EEPROM.

Other peripherals may be connected to PCI bus 306 as well. Network interface card (NIC) 310, small computer serial interface (SCSI) host bus adapter 312, and expansion bus interface 314 are directly connected to PCI bus 306. Audio adapter 316 and graphics adapter 318 are typically interfaced to PCI bus 306 via add-in cards inserted into expansion slots. Expansion bus interface 314 provides an interface for a keyboard and mouse adapter 320, a modem 322, and a local storage device 324. Local storage device 324 may be a non-volatile memory device such as a flash-memory, floppy disk drive, CD drive, or other persistent electronic, magnetic, or optical drive.

It should be appreciated that blade-PC 118 has the available interfaces to attach to external devices, but no external devices other than a network connection and/or a modem connection are made to blade-PC 118. Although blade-PC 118 includes the processing and storage of a stand-alone computer, as described above, such capabilities are used by thin clients 114, 116 that provide the desired user interfaces and related capabilities. In any configuration, computer 118 depicted in FIG. 3 and described above, is not meant to limit applicable embodiments of the invention to a particular computer architecture, and that it may be configured differently depending on the type of computer and application(s).

Typically, the various bootable peripherals that are attached to PCI bus 306 usually require interface code and parameters in the form of firmware to control and otherwise communicate with the peripheral. Such code and parameters are typically stored in a memory device, commonly referred to as an option ROM or OPROM, which is located on the interface card connected to the peripheral. For example, network interface card 310 has an associated NIC option ROM 311 that provides code and parameters for interfacing to network 102 which is communicably coupled to blade-PC 118 through NIC 310. In one embodiment, NIC option ROM 311 has stored therein preboot execution environment (PXE)

services that allow blade-PC 118 to connect to PXE server 108 on network 102. In applications in which recovery of the BIOS code image is achieved locally on, for example, a floppy, CD-ROM, USB drive and the like, then SCSI interface card 312 may also include an option ROM 313 corresponding to the storage device available to blade-PC 118 through that interface card. These include, for example, floppy option ROM code if the device is a floppy drive, CD option ROM code if the device is a CD drive, or flash option ROM code if the device is a flash memory, etc.

Figure 4:
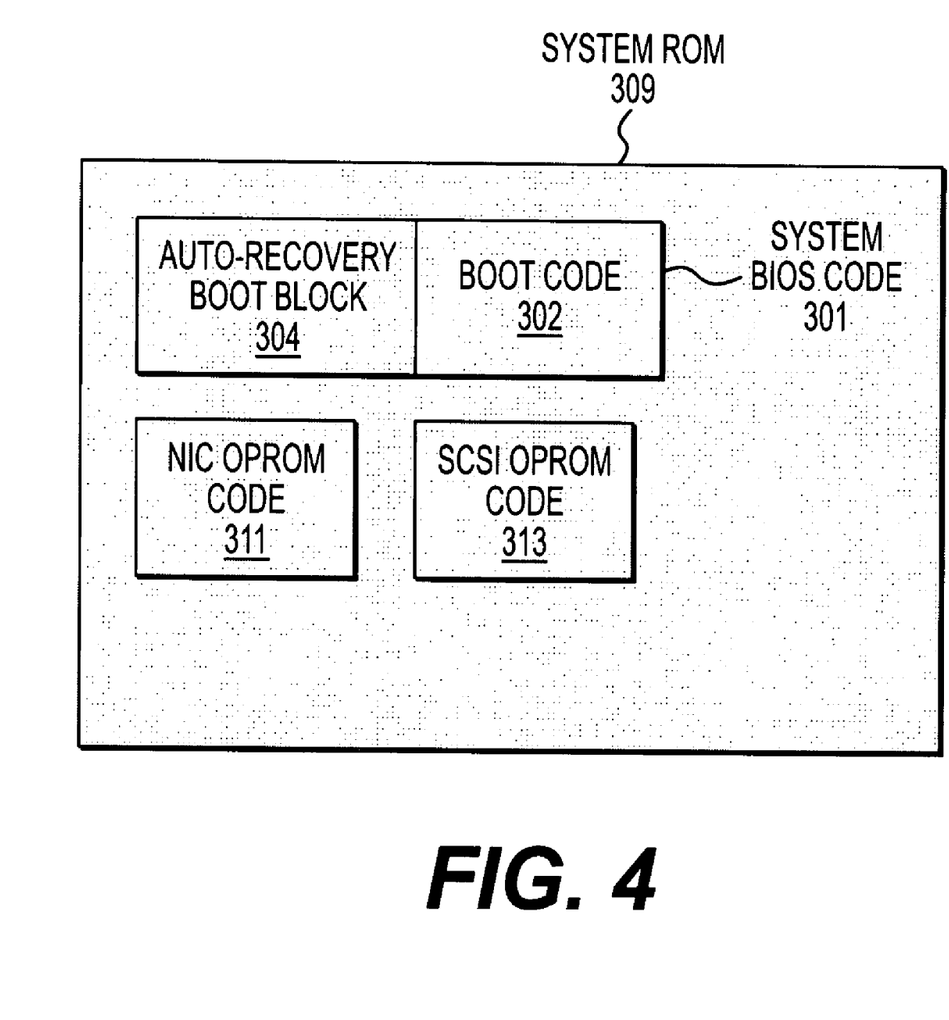
FIG. 4 is a logical block diagram of the contents of the system ROM illustrated in FIG. 4 in accordance with one embodiment of the present invention.

In a blade-PC such as blade-PC 118, such option ROMs are typically integrated onto the system board and may further be logically embedded within system ROM 309. FIG. 4 is a logical block diagram of one such embodiment of system ROM 309 of blade-PC 118. System ROM 309 has stored therein BIOS code 301 comprising auto-recovery boot block code 304 and BIOS boot code 304, NIC option ROM image 311, and SCSI option ROM image 313. Such option ROM code may be separately partitioned in system ROM image 309 or, as noted, they can be located on the appropriate add-in or expansion cards designed to interface the associated peripheral to blade-PC 118, as shown in FIG. 3. It should also be appreciated that such option ROM code may be included in other storage devices accessible to a network 100.

Figure 5:
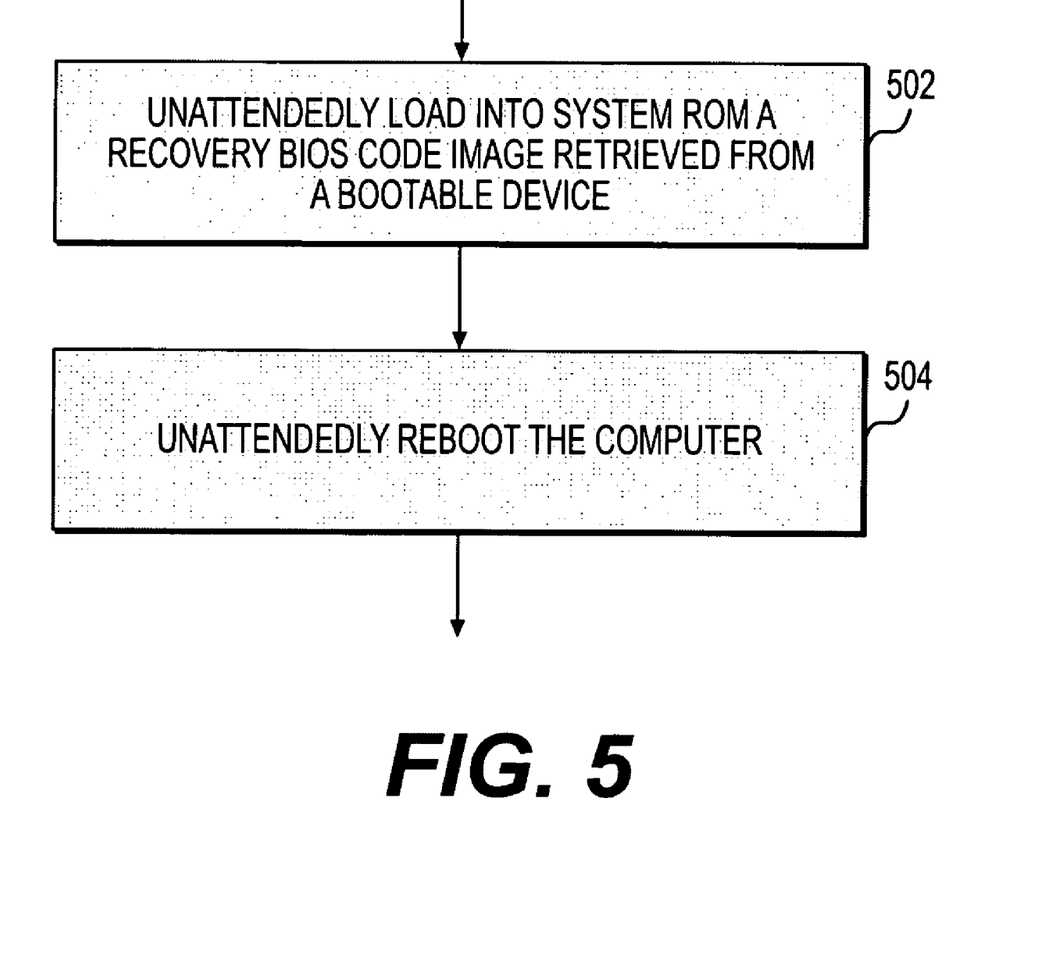
FIG. 5 is a high-level flow chart of a BIOS recovery process in accordance with one embodiment of the present invention.

FIG. 5 is a high-level flowchart of the operations performed to recover from a corrupted BIOS in accordance with one embodiment of the present invention. Process 500 may be performed in response to auto-recovery boot block 304 automatically determining that BIOS code 301 is corrupted. Such a determination is made during the power-on self test (POST) operations during a boot sequence. Alternatively, process 500 may be performed in response to a user invocation to recover system BIOS code 301.

At block 502 boot block 304 unattendedly loads into system ROM 309 a recovery BIOS code image 250 which has been retrieved from a bootable device accessible to the computer. Such a bootable device may be located locally on the computer or may be located remotely to the computer elsewhere in network 100. As noted, such operations may be performed without user involvement or invocations.

Once the recovery BIOS code image 250 has been loaded in system ROM, boot block 304 unattendedly reboots the computer at block 504. Such a rebooting may be achieved by removing and applying power to the computer. Alternatively, a warm start or warm reset may be triggered by boot block 304. The computer will thereafter boot with recovery boot code image 252.

Figure 6:
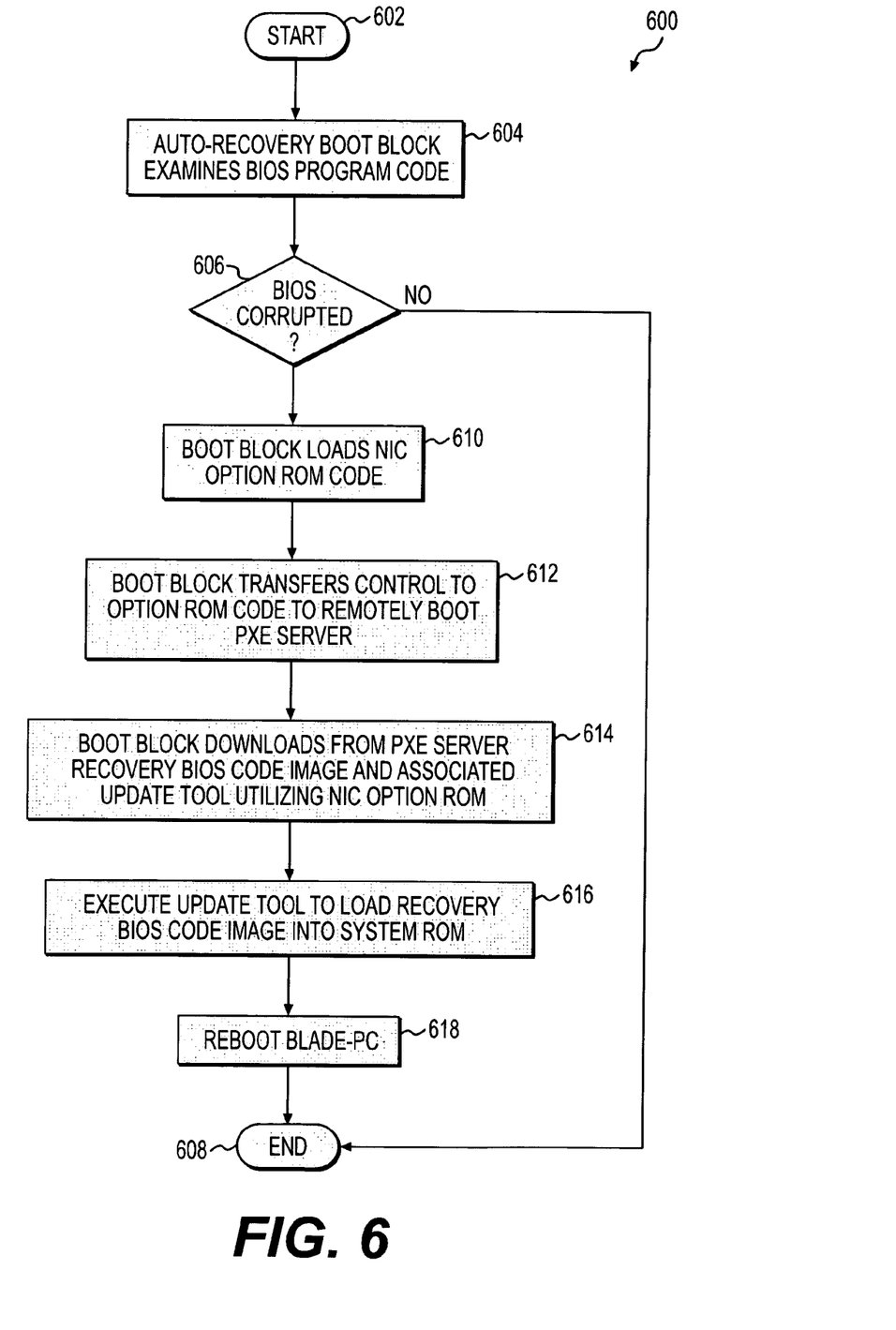
FIG. 6 is a detailed flow chart of a BIOS recovery process in accordance with one embodiment of the present invention.

FIG. 6 is a detailed flow chart of an unattended BIOS recovery process performed in accordance with one embodiment of the present invention. The operations depicted in FIG. 6 will be described in the context of an exemplary blade-PC 118, with the recovery BIOS code image 250 being remotely located on PXE server 108, as described above. It should be appreciated by those of ordinary skill in the art that embodiments of the present invention can be implemented in any computing platform now or later developed and can be configured to recover the BIOS code image from any accessible local or remote bootable device such as server 104, network storage 112 or a storage device connected to SCSI host adapter 312. It should further be appreciated that use of PXE as the protocol for downloading files is just one example, and that any proprietary or standard protocol now or later developed can be used.

Referring now to FIG. 6, when blade-PC 118 is initially powered or reset, it executes BIOS boot code 302 to boot the computer. Boot block code 304 is the first code that is executed by processor 305 during the POST operations of the boot sequence. BIOS code recovery process 600 is invoked at start block 502 during power-on self test (POST) operations of the boot sequence.

At block 604, boot block 304 examines BIOS boot code 304 to determine if the BIOS code is corrupted. Boot block 304 may implement one of a variety of techniques to validate BIOS boot code 302. For example, and in no way limiting, boot block 304 may use a check sum, cyclical redundancy checking (CRC), cryptographic means, or checking flags that are set by an update tool application program for verifying that BIOS code 301 is not corrupted.

In the event that boot block 304 does not detect a corrupted BIOS 301, process 600 ceases at block 608 and the BIOS boot code 302 completes the boot sequence. On the other hand, in the event that boot block 304 detects a corrupted BIOS 301, process 600 continues at block 610.

At block 610, boot block code 302 loads a predetermined option ROM code that accesses a predetermined storage location that contains recovery BIOS code image 250 and, preferably, its associated update tool 252. In this illustrative example, recovery BIOS code image 250 and the associated update tool 252 are located on preboot execution environment (PXE) server 108 on network 100. In such an embodiment, boot code 302 loads NIC option ROM code 311, either from system ROM 309 or from network interface card 310. NIC option ROM code 311 includes the option ROM code necessary to communicate with peripheral devices which are accessible via network interface card 310. In this illustrative example, this includes PXE option ROM code necessary for booting and communicating with PXE server 108.

At block 612, control is passed from boot block 304 to NIC option ROM code 311 to connect blade-PC 118 to network 102 and to remotely boot PXE server 108. At block 614, boot block 304, under control of NIC option ROM code 311, downloads from PXE server 108 recovery BIOS code image 250 and its associated update tool 252. Boot block 304 then executes update tool 252 at block 616 to load recovery BIOS code image 250 into system ROM 309.

At block 618, blade-PC 118 is automatically re-booted with the installed BIOS recovery image 250. Such a re-booting may be achieved by removing and reapplying power to blade-PC 118. Alternatively, a warm boot or warm reset may be triggered by boot block 304. Blade-PC 118 will then boot properly with recovery BIOS code image 250. As noted, some embodiments of the present invention are particularly beneficial when used in blade-PC systems. Should more than one co-located blade-PC experience a corrupted BIOS code, the above operations are repeated either concurrently or sequentially for each such blade-PC.

It should be appreciated that other variations to and modifications of the above-described method for automatic BIOS recovery may be made without departing from the inventive concepts described herein. For example, the above process may be executed by any computer, PC, blade-PC, network computer, web appliance, palm computer, hand-help computer, or PDA with access to the predetermined storage location of the BIOS recovery image and update tools whether internally located or via a network. As another example, embodiments of the present invention may be implemented in the boot block or other portions of BIOS or separately from the BIOS.

What is claimed is:

1. A method for recovering a basic input/output system (BIOS) code comprising:

loading a BIOS recovery code image into system memory of a blade personal computer (blade-PC) having no connected input/output devices from a pre-boot execution environment (PXE) server when the BIOS code of the blade-PC is corrupt; and rebooting the blade-PC once the BIOS recovery code image replaces the BIOS code of the blade-PC, wherein the blade-PC is connected to at least one thin client having one or more input/output devices, and wherein the at least one thin client uses the replaced BIOS code on the blade-PC to communicate with the one or more input/output devices.

2. The method of claim 1, further comprising the step of:
determining that the BIOS code of the blade-PC is corrupt.

3. The method of claim 2, wherein determining that the BIOS code is corrupt occurs during a BIOS power-on self test (POST) operation.

4. The method of claim 1, further comprising the steps of:
loading an update tool from the PXE server; and
executing the update tool to load the BIOS recovery code image into the system memory.

5. The method of claim 1, wherein the blade-PC further comprises a network card for communicating with the PXE server.

6. The method of claim 1, wherein the at least one thin client has a network connection for communication with the blade-PC.

7. The method of claim 1, wherein the system memory comprises a non-volatile memory.

8. The method of claim 1, wherein the one or more input/output devices comprises a keyboard, mouse, monitor, and external disk drive.

9. The method of claim 1, wherein the step of loading the BIOS recovery code is done unattended.

10. The method of claim 1, wherein the step of rebooting the blade-PC is done unattended.

11. A method for recovering a basic input/output system (BIOS) code comprising:
concurrently loading a BIOS recovery code image into system memory of a plurality of co-local blade personal computers (blade-PCs), each blade-PC having no connected input/output devices, from one pre-boot execution environment (PXE) server when the BIOS code of each of the plurality of co-local blade-PCs is corrupt; and rebooting each of the plurality of co-local blade-PCs once the BIOS recovery code image replaces the BIOS code of each of the plurality of co-local blade-PCs, wherein each of the plurality of co-local blade-PCs is connected to at least one thin client having one or more input/output devices, and wherein the at least one thin client uses the replaced BIOS code on the connected blade-PC to communicate with the one or more input/output devices.

12. The method of claim 11, further comprising the step of:
determining that the BIOS code of each of the plurality of co-local blade-PCs is corrupt.

13. The method of claim 12, wherein determining that the BIOS code is corrupt occurs during a BIOS power-on self test (POST) operation.

14. The method of claim 11, further comprising the steps of:
loading an update tool from the PXE server; and
executing the update tool to load the BIOS recovery code image into the system memory.

15. The method of claim 11, wherein each of the plurality of co-local blade-PCs further comprises a network card for communicating with the one PXE server.

16. The method of claim 11, wherein the at least one thin client has a network connection for communication with one of the plurality of co-local blade-PCs.

17. The method of claim 11, wherein the system memory comprises a non-volatile memory.

18. The method of claim 11, wherein the one or more input/output devices comprises a keyboard, mouse, monitor, and external disk drive.

19. The method of claim 11, wherein the step of concurrently loading the BIOS recovery code is done unattended.

20. The method of claim 11, wherein the step of rebooting each of the plurality of co-local blade-PCs is done unattended.

21. A system for recovering a basic input/output system (BIOS) code comprising:
means for loading a BIOS recovery code image into system memory of a blade personal computer (blade-PC) having no connected input/output devices from a pre-boot execution environment (PXE) server when the BIOS code of the blade-PC is corrupt; and means for rebooting the blade-PC once the BIOS recovery code image replaces the BIOS code of the blade-PC, wherein the blade-PC is connected to at least one thin client having one or more input/output devices, and wherein the at least one thin client uses the replaced BIOS code on the blade-PC to communicate with the one or more input/output devices.

22. The system of claim 21, further comprising:
means for determining that the BIOS code of the blade-PC is corrupt.

23. The system of claim 21, the means for loading loads an update tool from the PXE server.

24. The system of claim 23, further comprising:
means for executing the update tool to load the BIOS recovery code image into the system memory.

25. The system of claim 21, wherein the blade-PC further comprises a network card for communicating with the PXE server.

26. The system of claim 21, wherein the at least one thin client has a network connection for communication with the blade-PC.

27. The system of claim 21, wherein the system memory comprises a non-volatile memory.

28. The system of claim 21, wherein the one or more input/output devices comprises a keyboard, mouse, monitor, and external disk drive.

29. The system of claim 21, wherein the loading means is configured to unattendedly load the BIOS recovery code image.

30. The system of claim 21, wherein the rebooting means is configured to unattendedly reboot the blade-PC.

31. A system for recovering a basic input/output system (BIOS) code comprising:
means for concurrently loading a BIOS recovery code image into system memory of a plurality of co-local blade personal computers (blade-PCs), each blade-PC having no connected input/output devices, from one pre-boot execution environment (PXE) server when the BIOS code of each of the plurality of co-local blade-PCs is corrupt; and means for rebooting each of the plurality of co-local blade-PCs once the BIOS recovery code image replaces the BIOS code of each of the plurality of co-local blade-PCs, wherein each of the plurality of co-local blade-PCs is connected to at least one thin client having one or more input/output devices, and wherein the at least one thin client uses the replaced BIOS code on the connected blade-PC to communicate with the one or more input/output devices.

32. The system of claim 31, further comprising the step of:
    means for determining that the BIOS code of each of the plurality of co-local blade-PCs is corrupt.

33. The system of claim 31, the means for loading loads an update tool from the PXE server.

34. The system of claim 33, further comprising:
    means for executing the update tool to load the BIOS recovery code image into the system memory.

35. The system of claim 31, wherein each of the plurality of co-local blade-PCs further comprises a network card for communicating with the one PXE server.

36. The system of claim 31, wherein the at least one thin client has a network connection for communication with one of the plurality of co-local blade-PCs.

37. The system of claim 31, wherein the system memory comprises a non-volatile memory.

38. The system of claim 31, wherein the one or more input/output devices comprises a keyboard, mouse, monitor, and external disk drive.

39. The system of claim 31, wherein the concurrently loading means is configured to unattendedly load the BIOS recovery code image.

40. The system of claim 31, wherein the rebooting means is configured to unattendedly reboot each of the plurality of co-local blade-PCs.

* * * * *